(12) United States Patent
Rutt et al.

(10) Patent No.: US 11,122,817 B2
(45) Date of Patent: Sep. 21, 2021

(54) PROTEIN RICH FOOD INGREDIENT FROM BIOMASS AND METHODS OF PRODUCTION

(71) Applicant: Synthetic Genomics, Inc., La Jolla, CA (US)

(72) Inventors: George C. Rutt, San Diego, CA (US); James H. Flatt, Colorado Springs, CO (US); Peter Domaille, San Diego, CA (US); Gerardo V. Toledo, Belmont, MA (US); Daniel G. Dueppen, San Diego, CA (US)

(73) Assignee: Smallfood Inc., Halifax (CA)

( * ) Notice: Subject to any disclaimer, the term of this patent is extended or adjusted under 35 U.S.C. 154(b) by 0 days.

(21) Appl. No.: 15/005,695

(22) Filed: Jan. 25, 2016

(65) Prior Publication Data

US 2016/0135480 A1    May 19, 2016

Related U.S. Application Data

(63) Continuation-in-part of application No. 14/809,051, filed on Jul. 24, 2015.

(60) Provisional application No. 62/029,324, filed on Jul. 25, 2014.

(51) Int. Cl.
  *A23J 1/00* (2006.01)
  *A23L 33/195* (2016.01)
  *A23K 20/147* (2016.01)

(52) U.S. Cl.
  CPC ............... *A23J 1/008* (2013.01); *A23J 1/006* (2013.01); *A23J 1/009* (2013.01); *A23K 20/147* (2016.05); *A23L 33/195* (2016.08)

(58) Field of Classification Search
  CPC ...... A23J 1/09; A23J 1/008; A23J 3/20; A23J 1/006; A23J 1/009; A23K 20/147; A23L 33/195
  USPC ........................................................ 426/634
  See application file for complete search history.

(56) References Cited

U.S. PATENT DOCUMENTS

| | | | |
|---|---|---|---|
| 3,197,309 A | 7/1965 | Chapman et al. | |
| 5,130,242 A | 7/1992 | Barclay | |
| 8,084,038 B2 | 12/2011 | Kale | |
| 8,197,691 B2 | 6/2012 | Kale | |
| 8,318,019 B2 | 11/2012 | Kale | |
| 8,323,501 B2 | 12/2012 | Kale | |
| 8,475,660 B2 | 7/2013 | Kale | |
| 8,551,336 B2 | 10/2013 | Kale | |
| 8,552,160 B2 | 10/2013 | Kale | |
| 8,658,772 B2 | 2/2014 | Kale | |
| 8,748,588 B2 | 6/2014 | Kale | |
| 2004/0058051 A1 | 3/2004 | Yunusov et al. | |
| 2005/0186312 A1 | 8/2005 | Loh et al. | |
| 2006/0198938 A1 | 9/2006 | Chen et al. | |
| 2010/0233760 A1* | 9/2010 | Apt ...................... | C12N 9/2431 435/69.1 |
| 2010/0239712 A1 | 9/2010 | Brooks et al. | |
| 2010/0260887 A1 | 10/2010 | Ufaz et al. | |
| 2010/0303990 A1* | 12/2010 | Brooks .................. | A21D 2/165 426/541 |
| 2011/0086386 A1 | 4/2011 | Czartoski | |
| 2011/0256282 A1 | 10/2011 | Piechocki et al. | |
| 2011/0274797 A1 | 11/2011 | Segall et al. | |
| 2011/0319596 A1 | 12/2011 | De La Torre-Montemayor | |
| 2012/0021457 A1 | 1/2012 | Tang | |
| 2012/0035348 A1 | 2/2012 | Kale | |
| 2012/0053327 A1 | 3/2012 | Kale | |
| 2012/0128851 A1* | 5/2012 | Brooks .................. | A21D 2/165 426/541 |
| 2012/0258236 A1 | 10/2012 | Cruz et al. | |
| 2013/0017594 A1 | 1/2013 | Raney et al. | |
| 2013/0122180 A1 | 5/2013 | Brooks et al. | |
| 2013/0142905 A1 | 6/2013 | Gibbons et al. | |
| 2014/0005422 A1 | 1/2014 | Kale | |
| 2015/0201649 A1 | 7/2015 | Lei | |
| 2016/0183565 A1 | 6/2016 | Rudinger et al. | |
| 2016/0340640 A1 | 11/2016 | Macquart et al. | |
| 2018/0208886 A1 | 7/2018 | Cagnac et al. | |

FOREIGN PATENT DOCUMENTS

| | | |
|---|---|---|
| CN | 101 429 467 A | 5/2009 |
| CN | 102020705 B | 8/2012 |
| CN | 103748104 A | 4/2014 |
| EP | 1 433 463 B1 | 9/2010 |
| WO | WO 2011/057406 A1 | 5/2011 |
| WO | WO 2011/130578 A2 | 10/2011 |
| WO | WO 2012/049503 A1 | 4/2012 |
| WO | WO 2014/015000 A1 | 1/2014 |
| WO | WO 2014/046543 A1 | 3/2014 |

(Continued)

OTHER PUBLICATIONS

Ross, A. B. et al. J. Anal. Appl. Pyrolysis. 85: 3-10 (2009) (Year: 2009).*
International Search Report dated Apr. 8, 2016, regarding PCT/US2016/014725. pp. 1-28.
International Search Report dated Oct. 30, 2015, regarding PCT/US2015/042113. pp. 1-9.
Extended European Search Report dated Nov. 14, 2017, regarding EP 15 82 5225. pp. 1-14.
Gerde, Jose A. et al: "Optimizing protein isolation from defatted and non-defatted Nannochloropsis microalgae biomass"; Algal Research, 2013, vol. 2, pp. 145-153.
Japanese Office Action dated May 23, 2019, regarding JP 2017-504026.

(Continued)

*Primary Examiner* — Hamid R Badr
(74) *Attorney, Agent, or Firm* — DLA Piper LLP (US)

(57) ABSTRACT

The present invention provides a protein material and food ingredient from a sustainable and stable source. The sustainable and stable source of the food or food ingredient is cellular biomass, for example an algal or microbial biomass. The invention discloses that the cellular biomass can be subjected to a series of steps to derive the protein material and food or food ingredient, which has high nutritional content and has pleasing organoleptic properties.

6 Claims, 3 Drawing Sheets

(56) References Cited

FOREIGN PATENT DOCUMENTS

| WO | WO 2014/199220 A1 | 12/2014 |
| WO | WO 2015/011418 A1 | 1/2015 |
| WO | WO 2015/107312 | 7/2015 |
| WO | WO2015150716 A2 | 10/2015 |
| WO | WO 2016/015013 A1 | 1/2016 |
| WO | WO 2017/012931 | 1/2017 |

OTHER PUBLICATIONS

Database WP I, Week 201150, Thomson Scientific, London, GB; AN 2011-G00165, XP002791852, & CN 102 020 705 A (Univ Yangtze) Apr. 20, 2011.

International Search Report dated Apr. 14, 2017, regarding PCT/US2017/015177.

Pitchford, Paul: "Chlorella: A Nutrient-Rich Algae"; Chlorella Facts, NaturoDoc, 2012, pp. 1-7.

Supplementary Partial European Search Report dated Jun. 17, 2019, regarding EP 17 74 4909.

Lin, Jiaping et al.: "*Preparation and Evaluation of the Chelating Nanocomposite Fabricated with Marine Algae Schizochytrium sp. Protein Hydrolysate and Calcium*"; J. Agric. Food Chem., 2015, 63, 44, 9704-9714.

Nakazawa, Atsushi et al.: "*Optimization of biomass and fatty acid production by Aurantiochytriou sp. Strain 4W-1b*"; Pocedia Environmental Sci., 15: 2012, 27-33.

EP Office Action in European Application No. 17744909.7, dated Nov. 18, 2020, 5 pages.

JP Office Action in Japanese Application No. 2018-539156, dated Sep. 17, 2020, 8 pages (with English translation).

\* cited by examiner

PROTEIN RICH FOOD INGREDIENT FROM BIOMASS AND METHODS OF PRODUCTION

This application is a continuation-in-part of application Ser. No. 14/809,051, filed Jul. 24, 2015, and claims the benefit of U.S. provisional application No. 62/029,324, filed Jul. 25, 2014, each of which are hereby incorporated by reference in their entireties, including all Tables, Figures, and Claims.

BACKGROUND

Proteins are essential nutritional components and protein rich material is often added to various types of food products in order to increase the nutritional content. Current sources of protein material include various plant, grain, and animal sources, but their availability is often subject to wide seasonal fluctuations, the weather, crop failures, and other unpredictable factors therefore limiting their commercial use by food manufacturers. Grain based solutions for protein production also consume a large amount of productive land and water resources that might otherwise be better utilized. These sources are also limited in their ability to supply sustainable supplies of proteins in the quantities necessary. Additional and more reliable sources of proteins are needed to supply both a growing humanity and as feed for domestic animals.

Algal and microbial sources of proteins or other nutritional materials have great potential and would be highly desirable as they can reduce seasonal fluctuations and nevertheless provide a consistent, economic, and sustainable source of nutritional materials to food providers. Proteins and other nutritional materials produced by these sources could be used to supplement cereals, snack bars, and a wide variety of other food products. Furthermore, if organisms dependent on photosynthesis for energy (e.g., algae) could be made to produce useable proteins, it would have a highly favorable effect on the energy equation in food production.

However, algal and microbial sources of proteins often suffer from significant disadvantages in that they contain substances that are severely displeasing in terms of their organoleptic taste and smell properties. It would be highly advantageous to be able to harvest proteins from algal and/or microbial organisms that do not have the displeasing organoleptic properties. Such proteins would be very useful as foods, food ingredients, and nutritional supplements.

SUMMARY OF THE INVENTION

The present invention provides methods for producing a proteinaceous food or food ingredient from a sustainable, economic, and stable source such as microbial biomass. The methods generally involve the pasteurization of the biomass followed by a acid wash step where the pH of the biomass is lowered to a pH of less than 4.5 and held at such pH for at least 10 minutes. Additional steps can also be utilized such as a delipidation steps and/or a mechanical homogenization step. The methods produce a protein composition that has pleasing organoleptic properties. Also provided are methods of making a food product or food ingredient, and method of improving the organoleptic properties of a proteinaceous composition. Also provided is a proteinaceous food or food ingredient having acceptable organoleptic taste and smell properties.

In a first aspect the invention provides methods of producing a protein composition from cellular biomass. The methods involve performing a pasteurization step on cellular biomass to produce a pasteurized biomass, subsequent to step a), exposing the pasteurized biomass to acidic conditions by adjusting the pH of the biomass to a depressed pH of 4.5 or less, or less than 4.5 and holding the pH of the biomass at said depressed pH for at least 10 minutes to convert the proto-protein into the protein composition. The acid conditions can be a depressed pH of less than 4.0 and the pH of the microbial biomass is held at said depressed pH for at least 20 minutes. In one embodiment the pH of the biomass is adjusted to about 3.5 and the pH is held for about 30 minutes. In another embodiment after adjusting the pH to the depressed pH of less than 4.0 the pH is adjusted to a raised pH of greater than 4.0. In yet another embodiment after adjusting the pH to the depressed pH of less than 4.0 the pH is adjusted to a raised pH of greater than 4.0. The biomass can be exposed to the acidic conditions by contacting the biomass with an inorganic acid. In various embodiments the inorganic acid can be sulfuric acid or hydrochloric acid.

In some embodiments the methods further involve performing a delipidation step on the cellular biomass. The methods can improve the organoleptic properties of a protein composition in the cellular biomass. The delipidation step can be performed after the pasteurization step and before the biomass is exposed to the acidic conditions, and the biomass is delipidated by subjecting it to mechanical homogenization while in contact with a solvent. The solvent can be, but is not limited to, any one of ethyl alcohol, isopropyl alcohol, and a mixture of hexane and acetone. The pasteurization step can involve exposing the biomass to a temperature of at least 55° C. for at least 20 minutes. The cellular biomass can be algal biomass.

In another aspect the invention provides methods of making a food product. The methods involve combining the protein material produced by a method of the invention with a food or food ingredient to make said food product. The food or food ingredient can be made according to any of the methods described herein. The food product can be, but is not limited to, a breakfast cereal, a snack bar, a soup or stew, a nutrition bar, a binder for bulk artificial meats, an artificial cheese. The food product can also be animal feed.

In various embodiments less than 25% of the protein molecules have a molecular weight of below 15 kD. The method can also decrease the ratio of arginine, glutamic acid, or hydroxyproline comprised in the protein material relative to the ratio in the delipidated biomass.

In some embodiments the methods can also involve a step of centrifugation and the production of a centrifugation pellet and supernatant, wherein the ratio of arginine in the pellet/supernatant is less than 1.0, or wherein the ratio of glutamic acid in the pellet/supernatant is less than 1.0.

In another aspect the invention provides a food ingredient. The food ingredient can be a protein material derived from cellular biomass according to a method of the invention, and the protein material can have at least 65% protein content (w/w); less than 6% lipid content (w/w); and less than 8% ash content. The lipids can be fatty acids, which can be polyunsaturated fatty acids. In one embodiment the cellular biomass is algal biomass and the algal protein composition contains at least 75% protein w/w and less than 5% lipid content w/w. The food ingredient can be produced in the faun of a powder.

In another aspect the invention provides methods of producing a protein material. The methods involve exposing a delipidated biomass that contains a proto-protein to acidic conditions by adjusting the pH of the biomass to a depressed pH of less than 4.5 and holding the pH of the biomass at said depressed pH for at least 10 minutes to convert the proto-protein into the protein material. In one embodiment the pH of the biomass can be adjusted to a depressed pH of less than 4.0 and the pH of the biomass is held at said depressed pH for about 30 minutes, but in other embodiments the pH of the biomass is adjusted to about 3.5 and the pH is held for about 30 minutes. In one embodiment after adjusting the pH to the depressed pH of less than 4.0 the pH is adjusted to a raised pH of greater than 4.0, but in another embodiment after adjusting the pH to the depressed pH of less than 4.0 the pH is adjusted to a raised pH of about 4.5.

In some embodiments less than 25% of the proto-protein molecules have a molecular weight of below 15,000 daltons. The methods of the invention can also decreases the ratio of arginine, glutamic acid (or glutamic acid and glutamine), or hydroxyproline comprised in the protein material relative to the ratio in the delipidated biomass. The methods can also involve a step of centrifugation and the production of a centrifugation pellet and supernatant, which can be done after the exposure to acidic conditions, and wherein the ratio of arginine in the pellet/supernatant is less than 1.0 and/or wherein ratio of glutamic acid in the pellet/supernatant is less than 1.0.

In another aspect the invention provides methods of improving the hedonic properties of a protein containing composition by subjecting the protein containing composition to a method of the present invention.

DETAILED DESCRIPTION OF THE INVENTION

The invention provides a stable and sustainable source of a proteinaceous food or food ingredient. The source of the food or food ingredient can be biomass produced by microbial biomass. Non-limiting examples of microbes that can be used to product the biomass include phototrophic and/or heterotrophic algae, kelp, and seaweed. The organisms can be either single cellular or multi-cellular organisms. These exemplary sources have great potential as a stable and sustainable source of proteinaceous food or food ingredients. The invention therefore discloses protein materials useful as food, food ingredients, or food supplements and which have high nutritional value and acceptable or pleasing organoleptic taste and smell properties. Also disclosed are methods of manufacturing the food ingredients and methods of manufacturing food products containing a food ingredient of the invention.

The invention provides a proteinaceous material that is useful as a food or food ingredient. A "proteinaceous" material can have a protein content of at least 50% or at least 60% or at least 65% or at least 68% or at least 70% or at least 72% or at least 75% or at least 78% or at least 80% or at least 85% or at least 90%, or from 50% to 70%, or from 65% to 75%, or from 70% to 80%, or from 70% to 85%, or from 70% to 90%, or from 75% to 90%, or from 80% to 100%, or from 90% to 100%, all w/w. In various embodiments the food or food ingredient contains all amino acids essential for humans and/or domestic animals and/or pets or any mammal. In some examples the animals can be cattle, swine, horses, turkeys, chickens, fish, or dogs and cats.

The proteinaceous food or food ingredient can have varied lipid content such as, for example, about 5% lipid or about 6% lipid or about 7% lipid, or about 8% lipid or less than 8% or less than 7% or less than 6% or less than 5% lipid or less than 4% lipid or less than 3% lipid or less than 2% lipid or less than 1% lipid or less than 0.75% lipid or less than 0.60% lipid or less than 0.5% lipid or from about 1% to about 5% lipid or from 2% to about 4% lipid. In different embodiments non-protein nitrogen content can be less than 12% or less than 10% or less than 8% or less than 7% or less than 6% or less than 5% or less than 4% or less than 3% or less than 2% or less than 1% or from about 1% to about 7% or from 2% to about 6% in the proteinaceous food or food ingredient. In a particular embodiment the food or food ingredient contains at least 80% protein w/w and less than 5% lipid w/w. The lipid content of the proteinaceous food or food ingredient can be manipulated as explained herein depending on the source of the protein material and the uses of the protein material to be produced, as well as by varying the steps in its production. The lipid content in the food or food ingredient can be provided, either partially or completely, by polyunsaturated fatty acids. The polyunsaturated fatty acids can be any one or more of gamma-linolenic acid, alpha-linolenic acid, linoleic acid, stearidonic acid, eicosapentaenoic acid, docosahexaenoic acid (DHA), and arachiconic acid, in any combinations. In any of the compositions the ash content can be less than 10% or less than 9% or less than 8% w/w.

The protein material of the invention can be utilized in a wide variety of foods. It can be used either as a supplement or a food substitute. As examples, the protein material can be utilized or incorporated within cereals (e.g. breakfast cereals containing mostly grain content), snack bars (a bar-shaped snack containing mostly proteins and carbohydrates), nutritional or energy bars (a bar-shaped food intended to supply nutrients and/or boost physical energy, typically containing a combination of fats, carbohydrates, proteins, vitamins, and minerals), canned or dried soups or stews (soup: meat or vegetables or a combination thereof, often cooked in water; stew: similar to soup but with less water and cooked at lower temperature than soup), as a binder for bulk and/or artificial meats (artificial meats are protein rich foods, usually based on soy or plant proteins, but having no real meat of animal origin in them, but they have characteristics associated with meat of animal origin), cheese substitutes, vegetable "burgers", animal or pet feed (e.g. in animal or livestock feed for consumption by domestic animals and/or pets—these feeds can be mostly grain products), and much more. It can also be a nutritional supplement such as a protein or vegetable protein powder. The protein material can also be converted into a food ingredient, e.g., a protein rich powder useful as a substitute for grain-based flour. The protein materials are useful as food ingredients or as foods for both human and animal consumers. In addition to providing an advantageous source of protein the proteinaceous material of the invention can also provide other nutrients, such as lipids (e.g., omega-3 and/or omega-6 fatty acids), fiber, a variety of micronutrients, B vitamins, iron, and other minerals being only some examples.

The algal or microbial organisms that are useful in producing the biomass from which the protein material of the invention is obtained can be varied and can be any algae, plant, moss, or microbe that produces a desired protein-containing product. In some embodiments the organisms can be algae (including those classified as "chytrids"), microalgae, Cyanobacteria, kelp, or seaweed. The organisms can be either naturally occurring or can be engineered to increase protein content or to have some other desirable characteristic. In particular embodiments microbial or algal sources are utilized. In different embodiments algae and/or cyanobacteria, kelp, and seaweed of many genera and species can be used, with only some examples being those of the genera *Arthrospira, Spirulina, Coelastrum* (e.g., proboscideum), macro algae such as those of the genus *Palmaria* (e.g., *palmata*) (also called Dulse), *Porphyra* (Sleabhac), *Phaeophyceae, Rhodophyceae, Chlorophyceae, Cyanobacteria, Bacillariophyta*, and *Dinophyceae*. The algae can be microalgae (phytoplankton, microphytes, planktonic algae) or macroalga. Examples of microalgae useful in the invention include, but are not limited to, *Achnanthes, Amphiprora, Amphora, Ankistrodesmus, Asteromonas, Boekelovia, Bolidomonas, Borodinella, Botrydium, Botryococcus, Bracteococcus, Chaetoceros, Carteria, Chlamydomonas, Chlorococcum, Chlorogonium, Chlorella, Chroomonas, Chrysosphaera, Cricosphaera, Crypthecodinium, Cryptomonas, Cyclotella, Dunaliella, Ellipsoidon, Emiliania, Eremosphaera, Ernodesmius, Euglena, Eustigmatos, Franceia, Fragilaria, Fragilariopsis, Gloeothamnion, Haematococcus* (e.g., pluvialis), *Halocafeteria, Hantzschia, Heterosigma, Hymenomonas, Isochrysis, Lepocinclis, Micractinium, Monodus, Monoraphidium, Nannochloris, Nannochloropsis, Navicula, Neochloris, Nephrochloris, Nephroselmis, Nitzschia, Ochromonas, Oedogonium, Oocystis, Ostreococcus, Parachlorella, Parietochloris, Pascheria, Pavlova, Pelagomonas, Phceodactylum, Phagus, Picochlorum, Platymonas, Pleurochrysis, Pleurococcus, Porphyridium, Prototheca, Pseudochlorella, Pseudoneochloris, Pseudostaurastrum, Pyramimonas, Pyrobotrys, Scenedesmus* (e.g., obliquus), *Schizochlamydella, Skeletonema, Spyrogyra, Stichococcus, Tetrachlorella, Tetraselmis, Thalassiosira, Tribonema, Vaucheria, Viridiella, Vischeria*, and *Volvox*.

The cells or organisms of the invention can be any microorganism of the class Labyrinthulomycetes. While the classification of the Thraustochytrids and Labyrinthulids has evolved over the years, for the purposes of the present application, "labyrinthulomycetes" is a comprehensive term that includes microorganisms of the orders Thraustochytrid and Labyrinthulid, and includes (without limitation) the genera *Althornia, Aplanochytrium, Aurantiochytrium, Botryochytrium, Corallochytrium, Diplophryids, Diplophrys, Elina, Japonochytrium, Labyrinthula, Labryinthuloides, Oblongochytrium, Pyrrhosorus, Schizochytrium, Thraustochytrium*, and *Ulkenia*. In some examples the microorganism is from a genus including, but not limited to, *Thraustochytrium, Labyrinthuloides, Japonochytrium*, and *Schizochytrium*. Alternatively, a host labyrinthulomycetes microorganism can be from a genus including, but not limited to *Aurantiochytrium, Oblongichytrium*, and *Ulkenia*. Examples of suitable microbial species within the genera include, but are not limited to: any *Schizochytrium* species, including *Schizochytrium aggregatum, Schizochytrium limacinum, Schizochytrium minutum*; any *Thraustochytrium* species (including former *Ulkenia* species such as *U. visurgensis, U. amoeboida, U. sarkariana, U. profunda, U. radiata, U. minuta* and *Ulkenia* sp. BP-5601), and including *Thraustochytrium striatum, Thraustochytrium aureum, Thraustochytrium roseum*; and any *Japonochytrium* species. Strains of *Thraustochytriales* particularly suitable for the presently disclosed invention include, but are not limited to: *Schizochytrium* sp. (S31) (ATCC 20888); *Schizochytrium* sp. (S8) (ATCC 20889); *Schizochytrium* sp. (LC-RM) (ATCC 18915); *Schizochytrium* sp. (SR21); *Schizochytrium aggregatum* (ATCC 28209); *Schizochytrium limacinum* (IFO 32693); *Thraustochytrium* sp. 23B ATCC 20891; *Thraustochytrium striatum* ATCC 24473; *Thraustochytrium aureum* ATCC 34304); *Thraustochytrium roseum* (ATCC 28210; and *Japonochytrium* sp. L1 ATCC 28207. For the purposes of this invention all of the aforementioned organisms, including the chytrids, are considered "algae" and produce "algal biomass" when fermented or cultured. But any cells or organisms that produce a microbial biomass that includes a desired protein can be utilized in the invention. In some embodiments the biomass is derived from organisms that produce a protein composition that is organoleptically undesirable or unacceptable, which can be to the extent that a proteinaceous material derived from the organism is organoleptically unacceptable as a food or food ingredient.

In still further embodiments the microbial organism can be oleaginous yeast including, but not limited to, *Candida, Cryptococcus, Lipomyces, Mortierella, Rhodosporidium, Rhodotortula, Trichosporon*, or *Yarrowia*. But many other types of algae, cyanobacteria, kelp, seaweed, or yeast can also be utilized to produce a protein rich biomass. These are not the only sources of biomass since biomass from any source can be used that contains desired proteinaceous material of significant nutritional value.

Biomass

Biomass is that biological material derived from (or having as its source) living or recently living organisms. Algal biomass is derived from algae, and microbial biomass is derived from microorganisms (e.g. bacteria, unicellular yeast, multicellular fungi, or protozoa). The term "cellular biomass" indicates algal and/or microbial biomass. Biomass utilized in the present invention can be derived from algae, microbes, or any organism or class of organisms, including those described herein. Microbial or algal biomass can be harvested from natural waters or cultivated. When cultivated, this can be done in open ponds or in a photobioreactor or fermentation vessels of any appropriate size. The microbes or algae can be either phototrophic or heterotrophic. In some embodiments only light and carbon dioxide are provided but nutrients can be included in any culture medium, for example nitrogen, phosphorus, potassium, and other nutrients. In other embodiments sugars (e.g., dextrose), salts (e.g., $Na_2SO_4$, $CaCl_2$, $(NH_4)_2SO_4$), and other nutrients (e.g., trace metals) are included in the culture medium depending on the specific needs of the culture.

When sufficient biomass has been generated the biomass can be harvested from fermentation or cultivation. The harvest can be taken or made into the form of a broth, suspension, or slurry. The biomass can generally be easily reduced by centrifugation to a raw biomass of convenient volume. Fermentation broth is also easily removed from the cells by centrifugation. One or more optional steps of washing the pellet can also be performed.

Organoleptic Properties

Organoleptic properties refers to those properties of a food or food ingredient relating to the sense of taste and/or smell, particularly with reference to the taste and/or smell property being pleasing or unpleasant to a human or animal consumer. Methods of evaluating and quantifying the organoleptic taste and/or smell properties of foods are known by those of ordinary skill in the art. This evaluation enables one to place a particular food or food ingredient, on an organoleptic scale indicating a more or less desirable taste and/or smell property relative to another food or food ingredient.

Generally these methods involve the use of a panel of several persons, for example an evaluation panel of 3 or 4 or 5 or 6 or 7 or 8 or 9 or more than 9 persons. As further examples panels can also include 11 or 15 or 19 persons. The panel is generally presented with several samples to be evaluated (e.g., 3 or 4 or 5 or 6 or 7 or 8 or more than 8 samples) in a "blind" study where the panel members do not know the identity of each sample. The samples can be proteinaceous material derived from cellular biomass. The panel then rates the samples according to a provided scale, which can have 3 or 4 or 5 or 6 or more than 6 categories describing the taste and/or smell properties of each sample. The findings of panel members (e.g. a majority) can then be utilized to determine whether a food sample has more or less desirable organoleptic properties relative to other food samples provided. The categories can be correlated to more or less desirable organoleptic properties and can be comprised on an organoleptic scale. A sample scoring in one category is considered to have more or less desirable organoleptic properties than a sample scoring in another category. In some embodiments the biomass or proteinaceous material in the biomass has unacceptable or undesirable organoleptic properties, but the organoleptic properties of the proteinacous material can be improved by applying the methods described herein. The proteinaceous component can include the protein portion and any lipidic or other component that is covalently or otherwise closely associated with the protein component as described herein.

In some studies a "standard" food or proteinaceous material can be included to represent an acceptable organoleptic profile—i.e. taste and smell properties. Those samples rating equivalent to or higher than the standard are organoleptically acceptable or desirable while those rating lower are unacceptable or undesirable. In various embodiments the standard can be soy or whey or pea protein. The organoleptic properties of a proteinaceous material derived from biomass can be improved by applying the methods described herein.

One example of such a method of evaluating such properties of food is the 9 point hedonic scale, which is also known as the "degree of liking" scale. (Peryam and Girardot, N. F., *Food Engineering*, 24, 58-61, 194 (1952); Jones et al. *Food Research*, 20, 512-520 (1955)). This method evaluates preferences based on a continuum and categorizations are made based on likes and dislikes of participating subjects. The 9 point method is known to persons of skill in the art, and has been widely used and shown to be useful in the evaluation of food products. One can therefore evaluate whether certain foods have more desirable or less desirable taste and/or smell properties. Both taste and smell properties can be evaluated according to the hedonic scale. In one embodiment the protein food or food ingredient produced by the methods of the present invention scores higher on the 9 point hedonic scale versus protein products from the same source that has not been subjected to one or more steps of the invention. Other methods of evaluating organoleptic taste and/or smell properties can also be utilized.

The specific criteria utilized by an evaluation panel can vary but in one embodiment the criteria include whether the organoleptic properties of a sample are generally pleasing or displeasing. Thus, in one embodiment a sample can be rated as having generally pleasing organoleptic properties at least equivalent to a standard. Other common criteria that can be evaluated include, but are not limited to, whether the sample has a smell or taste that is briny (having a salty or salt water character), fishy (having a character related to fish), ammonia-like (having a character related to or resembling ammonia). Any one or more of these properties can be evaluated. These can be subjective determinations but people are familiar with these sensations and, when provided to a panel of persons to evaluate, meaningful conclusions are generated. Other criteria that can be used are the general organoleptic taste and smell properties of the sample indicated by whether the sample has more pleasing, less pleasing, or is about the same as a standard sample provided.

Certain chemicals that cause undesirable organoleptic properties are removed by the methods described herein. These chemicals can be one or more of a number of malodorous and/or foul tasting compounds, which in some cases are volatile compounds. Without wanting to be bound by any particular theory examples of compounds believed to contribute to undesirable organoleptic properties include lipidic compounds, including saturated or unsaturated or polyunsaturated fatty acids (e.g., DHA) and their breakdown products, lysophospholipids, aldehydes, and other breakdown products. These fatty acids or their breakdown products can also become oxidized (perhaps during isolation and/or purification of a proteinaceous material) and such compounds give unpleasant organoleptic properties to a food or food ingredient.

In some embodiments the compounds that confer undesirable organoleptic properties are lipidic material, which can be covalently bound to desired proteins or otherwise closely associated with the protein content of the material. Lipidic compounds can also be non-covalently bound but nevertheless closely associated with the protein in such a way that they cannot be purified way from the protein by conventional purification methods. The chemicals can also be saturated or unsaturated fatty acid moieties. The fatty acid (or fatty acid moieties) can comprise but are not limited to gamma-linolenic acid, alpha-linolenic acid, linoleic acid, stearidonic acid, eicosapentaenoic acid, docosahexaenoic acid (DHA), and arachiconic acid, any $\omega$-3 or $\omega$-6 fatty acid, a breakdown product of any of them, or any of the aforementioned in an oxidized form. The methods of the invention can reduce the amount of one or more of these compounds in the protein material by at least 20% or at least 30% or at least 40% or at least 50% or at least 70% or at least 80% or at least 90% versus the amount in protein material from the biomass that has not been subjected to a method of the invention. Malodorous and/or foul tasting compounds (organoleptically unacceptable compounds) can also include oxidized lipids (e.g., oxidized unsaturated fatty acids or oxidized omega-3 fatty acids, for example any of those described above) as well as proteins that can confer the malodorous and/or foul tasting properties. Malodorous and/or foul tasting compounds can also comprise lipidic material covalently bound to or otherwise closely associated with proteins in the proteinaceous material. Chemicals causing undesirable organoleptic properties can also be enzymatic or chemical breakdown products of lipid molecules, for example any of the lipid molecules described herein.

Methods

The methods of the invention can comprise any one or more, or all of the following steps. The methods can comprise a step of fermentation of cellular biomass, such as an algae or micro-algae or microbe; one or more steps of pasteurization; one or more steps of lysing and/or homogenization of the cellular biomass, which can be done by any suitable method (e.g., mechanical homogenization), and can be done in any of the solvents listed herein; one or more steps of delipidation of the cellular biomass, which can be performed in any suitable solvent as described herein and can be done simultaneously with or during the homogenization step; one or more steps of acid washing; one or more steps of solvent washing or solvent extraction, using any suitable solvent. Examples of suitable solvents are described herein. Solvent washing or solvent extraction can also remove lipid molecules (delipidation); additional steps can comprise drying of the cellular biomass; optionally passing of the biomass through a particle size classifier; and retrieval of proteinaceous material. The methods can involve performing the steps in any order, and one or more of the steps can be eliminated. One or more of the steps can be repeated to optimize the yield or quality of protein material from the biomass such as, for example, repetition of one or more delipidation step.

The selected biomass can be fermented in a fermentation broth and conditions desirable for the type of biomass selected. After fermentation one or more steps of washing the pellet can be performed. A step of mechanical homogenization can also be performed. This can be done, for example, by bead milling or ball milling, but other forms of mechanical homogenization can also be used. Some examples of mechanical homogenization include, but are not limited to, grinding, shearing (e.g., in a blender), use of a rotor-stator, a Dounce homogenizer, use of a French press, vortexer bead beating, or even shock methods such as sonication. More than one method can be used to homogenize the biomass.

Pasteurization is a process that destroys microorganisms through the application of heat. It is used in a wide variety of food preparation processes. Pasteurization can involve heating the biomass mixture to a particular temperature and holding it at the temperature for a minimum period of time. The pasteurization step can be accomplished by raising the temperature of the biomass to at least 50° C. or at least 55° C. or about 60° C. or at least 60° C. or at least 65° C. or about 65° C. or at least 70° C. or about 70° C., or from 50-70° C., or from 55-65° C. The mixture can be held at the temperature for at least 10 minutes or at least 15 minutes or at least 20 minutes or at least 25 minutes or 20-40 minutes, or 25-35 minutes or for about 30 minutes or for at least 35 minutes or at least 40 minutes or 30-60 minutes or for more than 60 minutes. Persons of ordinary skill in the art with resort to this disclosure will realize that pasteurization can also be accomplished at a higher temperature in a shorter period of time. Any suitable method of pasteurization can be used and examples include vat pasteurization, high temperature short time pasteurization (HTST), higher-heat shorter time (HHST) pasteurization, and in line pasteurization. Temperature and time periods can be selected accordingly.

When a pasteurization step is included it can be performed on the biomass subsequent to fermentation and prior to the acid wash step. In one embodiment the steps can include a pasteurization step, a homogenization step (e.g., bead milling), and an acid wash step, which may be performed in that order. In one embodiment the pasteurization step is performed prior to the homogenization step and/or prior to the acid wash step. In one embodiment the acid wash step is performed subsequent to the pasteurization step. In another embodiment the homogenization step is performed subsequent to the pasteurization step. The acid wash step can be performed either before or subsequent to the homogenization step and/or the pasteurization step. All of the steps can be performed in the order recited and additional steps can be performed before or after, or in between the recited steps. In one embodiment a solvent extraction (or solvent washing) step can be performed subsequent to the acid washing step.

A pasteurization step can be useful prior to the acid wash step when the biomass produces a protein with undesirable organoleptic properties, such as chytrids and/or certain types of algae often do. The pasteurization step can also occur prior to one or more solvent extraction step(s). Without wanting to be bound by any particular theory it is believed that pasteurization destroys cellular lipases and/or other cellular enzymes and prevents the formation of some free fatty acids and oxidized lipids or other undesirable compounds that would lower the organoleptic quality of the product.

These methods can yield a protein composition that has desirable organoleptic properties, even if the biomass is comprised of organisms that produce a proteinaceous material or other materials that have undesirable organoleptic properties. The methods can convert the proteinaceous material derived from the biomass from one having undesirable organoleptic properties into a protein composition that has more desirable organoleptic properties, and one that is suitable or acceptable as a food or food ingredient as measured by performing acceptably in an organoleptic evaluation.

Delipidation and Solvent Washing

In some embodiments the methods involve one or more steps of mechanical homogenization or mixing, which can involve (but is not limited to) bead milling or other high shear mixing (e.g. a ROTOSTAT® mixer) or emulsifying. A homogenization step can involve the creation of an emulsion, a suspension, or a lyosol, and can involve particle size reduction and dispersion to provide smaller particles distributed more evenly within a liquid carrier. Homogenization produces a more uniform or "homogenized" composition, such as a more consistent particle size and/or viscosity of the mixture. A batch or inline homogenization step can be performed. A homogenization step can be performed for at least 5 minutes or at least 10 minutes or at least 15 minutes or at least 20 minutes. These one or more steps can be followed by or separated by a step of centrifugation and (optionally) resuspension in a buffer or solvent for an (optional) additional step of homogenization or mixing. Other mechanical stressors include, but are not limited to ultrasonic homogenizers or roto/stator homogenizers, or homogenizers that use high speed rotors or impellers.

The biomass can be subjected to one or more delipidation step(s). The one or more delipidation step(s) can be done to the biomass prior to or after it is subjected to an acid wash, or both. Mechanic stress can be applied with the biomass in contact with an appropriate solvent. Thus, delipidation can involve a lipid extraction or solvent washing step. A solvent washing step involves exposure (or "washing") of the biomass to solvent for an appropriate period of time, which can be at least 5 minutes or at least 10 minutes or at least 15 minutes or about 15 minutes). The solvent can be any appropriate solvent, and in some embodiments is a polar solvent or a polar, protic solvent. Examples of useful polar, protic solvents include, but are not limited to ethanol, formic acid, n-butanol, isopropanol (IPA), methanol, acetic acid, nitromethane, hexane, acetone, water, and mixtures of any combination of them. For example, in one embodiment the solvent can be a combination of hexane and acetone (e.g., 75% hexane and 25% acetone). In another embodiment the solvent in 90% or 100% ethanol. Any suitable ratio of solvent to biomass can be used such as, for example, 5:1, 6:1, 7:1, 8:1, 9:1, and other ratios. But the skilled person will realize other appropriate solvents or combinations that will find use in the invention. In various embodiments a delipidation and/or solvent washing/extraction step can involve a reduction in the lipid content of the mixture of at least 20% or at least 50% or at least 60% or at least 70% or at least 80% or at least 90% or at least 95% or at least 97% or at least 98%, all w/w.

The delipidation step can ensure proper lysing of the cells (e.g. by mechanical homogenization) comprising the biomass to maximize the protein extraction and make lipidic material available for extraction from the biomass. After mechanical homogenization the biomass can be separated by centrifugation and the lipidic materials in the supernatant removed. One or more additional steps of delipidation or solvent washing with the solvent can be performed to maximize delipidation. In some embodiments a second or subsequent cycle(s) of delipidation can utilize a different solvent than used in the first cycle or in a previous cycle to increase the chances of removing more undesirable compounds. In some embodiments a second solvent can also be included to provide for separation, for example including hexane and/or acetone or another hydrophobic solvent can provide for separation and thus extract more undesirable hydrophobic compounds. After homogenization and at least one solvent washing step (solvent washing can be done simultaneously with homogenization by homogenizing in the presence of solvent) the mixture or biomass can be referred to as a delipidated biomass. The biomass can also have been subjected to mechanical homogenization as a separate step before the solvent washing steps.

Without wishing to be bound by any particular theory it is believed that compounds having undesirable organoleptic taste and smell properties are removed or inactivated in the pasteurization step and/or the one or more delipidation or solvent washing step(s) and/or the one or more acid wash step(s) and/or the one or more steps of solvent washing that can be applied following the one or more acid washing step(s). Additional substances with undesirable organoleptic properties can be removed by repeating any of the steps one or two or three or more than three times. Additional processes described herein can also be performed as one or more steps in the methods of making or synthesizing a protein material. The result of the processes is a material that is high in protein content and derived from biomass.

In various embodiments the protein material prepared according to the invention has a reduced lipid content. In some embodiments the methods of the invention reduce the lipid content of the biomass from more than 20% or more than 15% or more than 10% or more than 8% or more than 7% or more than 6% or more to 5% to less than 20% or less than 18% or less than 15% or less than 13% or less than 10% or less than 7% or less than 5% lipid content or less than 4% lipid content or less than 3% or less than 2% lipid content or less than 1% lipid content or less than 0.75% lipid or less than 0.6% lipid or less than 0.5% lipid, all w/w, present in the protein product material.

Acid Wash

In some embodiments the biomass is subjected to one or more acid wash step(s). The acid wash step can be performed on pasteurized and/or delipidated biomass. Acid washing can comprise exposing the delipidated biomass to acid or a depressed pH for a period of time. The biomass, and therefore the proto-protein it contains, can be exposed to the acid wash in a solution, suspension, slurry, or any suitable state. The acid wash can utilize any suitable inorganic acid or a suitable organic acid. The inorganic acids are derived from one or more inorganic compounds that Bona hydrogen ions when dissolved in water. Examples include, but are not limited to, sulfuric acid, nitric acid, phosphoric acid, boric acid, hydrochloric acid, hydrofluoric acid, hydrobromic acid, and perchloric acid. The person of ordinary skill will realize other inorganic acids that also function in the invention. The delipidated biomass can be mixed with water to generate an aqueous mixture. The acid solution (e.g., 1M sulfuric acid) can then be pipetted into the mixture until the pH is reduced to a depressed pH. In various embodiments the pH can be adjusted to a depressed pH of about 4.0 or about 3.8 or about 3.5 or about 3.3 or about 3.2 or about 3.0 or about 2.8 or about 2.5 or from about 2.0 to about 2.5 or from about 2.0 to about 3.0, or from about 2.0 to about 4.0, or from about 2.0 to about 3.5, or from about 2.2 to about 2.8, or from about 2.3 to about 2.7, or from about 2.2 to about 3.8, or from about 2.3 to about 3.7, or from about 2.5 to about 3.0, or from about 2.8 to about 3.2, or from about 3.0 to about 3.5, or from about 3.2 to about 3.8. In other embodiments the pH can be adjusted to less than about pH 4.0 or less than about pH 3.7 or less than about pH 3.6 or less than about pH 3.5 or less than about pH 3.3 or less than about pH 3.0 or less than about pH 2.7 or less than about pH 2.5. The mixture can then be held at the indicated pH for a period of time. The mixture can also be mixed or stirred or incubated for the period of time, or a portion thereof. The period of time can be any of at least 1 minute or at least 5 minutes or at least 10 minutes or at least 20 min. or at least 30 min, or from about 20 minutes or about 30 minutes, or about 40 minutes, or from 10-30 minutes, or from 10-40 minutes, or from 20-40 minutes, or from 20 minutes to 1 hour, or from 10 minutes to 90 minutes, or from 15 minutes to 45 minutes, or at least 1 hour or about 1 hour or at least 90 minutes or at least 2 hours.

After the biomass has been exposed to the depressed pH for an appropriate period of time (and optional mixing) the pH can then be raised to a raised pH by addition of a basic or alkaline compound, for example KOH. Persons of ordinary skill in the art will realize that other basic or alkaline compounds can also be used, for example sodium hydroxide, calcium hydroxide, or other basic compounds. The basic compound can be added at any convenient concentration, e.g., about 1 M or 0.5-1.5 M or 0.75-1.25M. The basic compound can be added until the pH is adjusted to a raised pH of about 4.5. But in other embodiments the raised pH can be about 4.0 or about 4.2 or about 4.7 or about 5.0. In more embodiments the pH can be raised to greater than 4.0 or greater than 4.2 or greater than 4.5 or greater than 4.7 or greater than 5.0. After the pH adjustment to the raised pH the mixture can be stirred or incubated for an appropriate period of time, which in some embodiments is about 30 min or about 1 hour or about 90 minutes or more than 30 minutes or more than 1 hour.

When the pH is adjusted to the depressed pH there is a noticeable decrease in the viscosity of the mixture from a thick slurry of poor mixing capability to a thin, watery consistency of markedly lower viscosity (i.e. there is an observable decrease in viscosity). The decrease in viscosity can be observed at the start of the acid addition by, for example, the inability of a common laboratory overhead mixer to be able to fully blend the solution (cavitation at the impeller). As the pH is lowered the change in viscosity can be observed as changing to a viscosity similar to a watery solution requiring a reduction in the impeller tipspeed to avoid splashing of the solution. Thus, the change in viscosity can be a decrease of at least 10% or at least 20% or at least 30% or at least 40% or at least 50%, as measured by standard methods of measuring viscosity such as a viscometer. Examples of methods of measuring viscosity include, but are not limited to, a glass capillary viscometer or a vibrating needle viscometer, a rheometer, a rotational rheometer, and the inclined plane test, but any suitable method can be utilized. When the pH is adjusted upwards to the raised pH the viscosity of the mixture increases, but does not achieve its viscosity prior to exposure to acidic conditions, revealing that a marked, irreversible, and permanent chemical change has occurred from the initial protein-containing mixture derived from the biomass.

Without wanting to be bound by any particular theory it is believed that subjecting the proto-protein to the delipidation and/or acid wash and/or other processes described herein may free or dissociate bound lipids by making (possibly irreversible) conformational changes in the proto-protein. It may also result in cleavage of covalently bound lipid-protein conjugates. The acid wash step does not truly hydrolyze the proteins in the biomass, but rather frees lipid moieties from the proteinacious (proto-protein) molecules in the biomass. The step may cause a conformational change in the proteins, and thereby freeing the lipidic moieties and allowing them to be removed. These processes may make the lipid species (or other solvent soluble molecules) available for removal during solvent washing and/or extraction steps. These steps, and possibly in combination with the additional steps described herein, are believed to thus remove the portions of the proto-protein that give the undesirable organoleptic properties, and thus provide the organoleptically acceptable protein material that is the food or food ingredient of nutritional interest in the invention, which is thus harvested. The protein-containing food or food product produced by the processes described herein is thus a markedly different molecule than the proto-protein that begins the processes.

Post-Acid Wash Re-Washing (Re-Working) Steps

Following the acid wash step there can be one or more steps of solvent extraction or washing, each optionally followed by a step of centrifugation to achieve a pellet, and resuspension in a solvent. The solvent can be any appropriate solvent as described herein for a solvent washing and/or delipidation step. After these steps, (if performed) post acid wash, the protein mixture can be optionally dried in a rotary evaporator to make a protein concentrate, which can be utilized as a food or food ingredient.

Proto-Protein

In some embodiments the biomass contains a proto-protein, which is a protein-containing molecule which also contains a significant non-protein moiety. In some embodiments the non-protein moiety is a lipid moiety. The proto-protein can be the protein produced by the biomass from which it is derived in its natural form, and before being treated according to the methods described herein. In some embodiments the proto-protein is close to the natural Ruin proteinaceous material and has undesirable or unfavorable organoleptic taste and smell properties and would score low on the "degree of liking" scale or other method of evaluating organoleptic properties. Various algae and microbes produce proteins with these characteristics, and in some embodiments the proto-protein is an algal protein with undesirable organoleptic properties. In the methods of the invention the biomass can be converted into a protein-containing food or food ingredient that has more desirable organoleptic properties and scores as acceptable on methods of evaluating such properties. Without wanting to be bound by any particular theory it is believed that the proto-protein may contain a lipidic component that gives the undesirable organoleptic taste and/or smell properties. Removal or disrupting of this protein (or its lipidic component) results in an improvement in organoleptic properties. In addition to (or instead of) lipid moieties the proto-protein can have other, molecular components or moieties that cause it to have (or worsen) its undesirable organoleptic properties. Therefore by applying the methods described herein the protein component of the biomass is converted into an organoleptically acceptable protein composition of the invention.

The molecular weight distribution of the proto-protein refers to the percentage of proto-protein molecules having a molecular weight within a specified size range or ranges. For example, the proto-protein may have a molecular weight distribution so that at least 50% or at least 60% or at least 70% or at least 80% of the proto-protein molecules (by weight) have a molecular weight of between about 10,000 and about 100,000 daltons, or from about 10,000 to about 50,000 daltons, or from about 20,000 to about 100,000 daltons, or from about 20,000 to about 80,000 daltons, or from about 20,000 to about 60,000 daltons, or from about 30,000 to about 50,000 daltons, or from about 30,000 to about 70,000 daltons, all non aggregated. In other embodiments at least 70% or at least 80% of the proto-protein molecules have a molecular weight of between about 10,000 and about 100,000 daltons, or from about 20,000 to about 80,000 daltons, or from about 30,000 to about 50,000 daltons, or from about 30,000 to about 70,000 daltons, all non-aggregated. In other embodiments the molecular weight distribution of the proto-protein may be such that less than 25% or less than 10% or less than 5% of the proto-protein molecules have a molecular weight below about 20,000 daltons or below about 15,000 daltons or below about 10,000 daltons.

Figure 1:
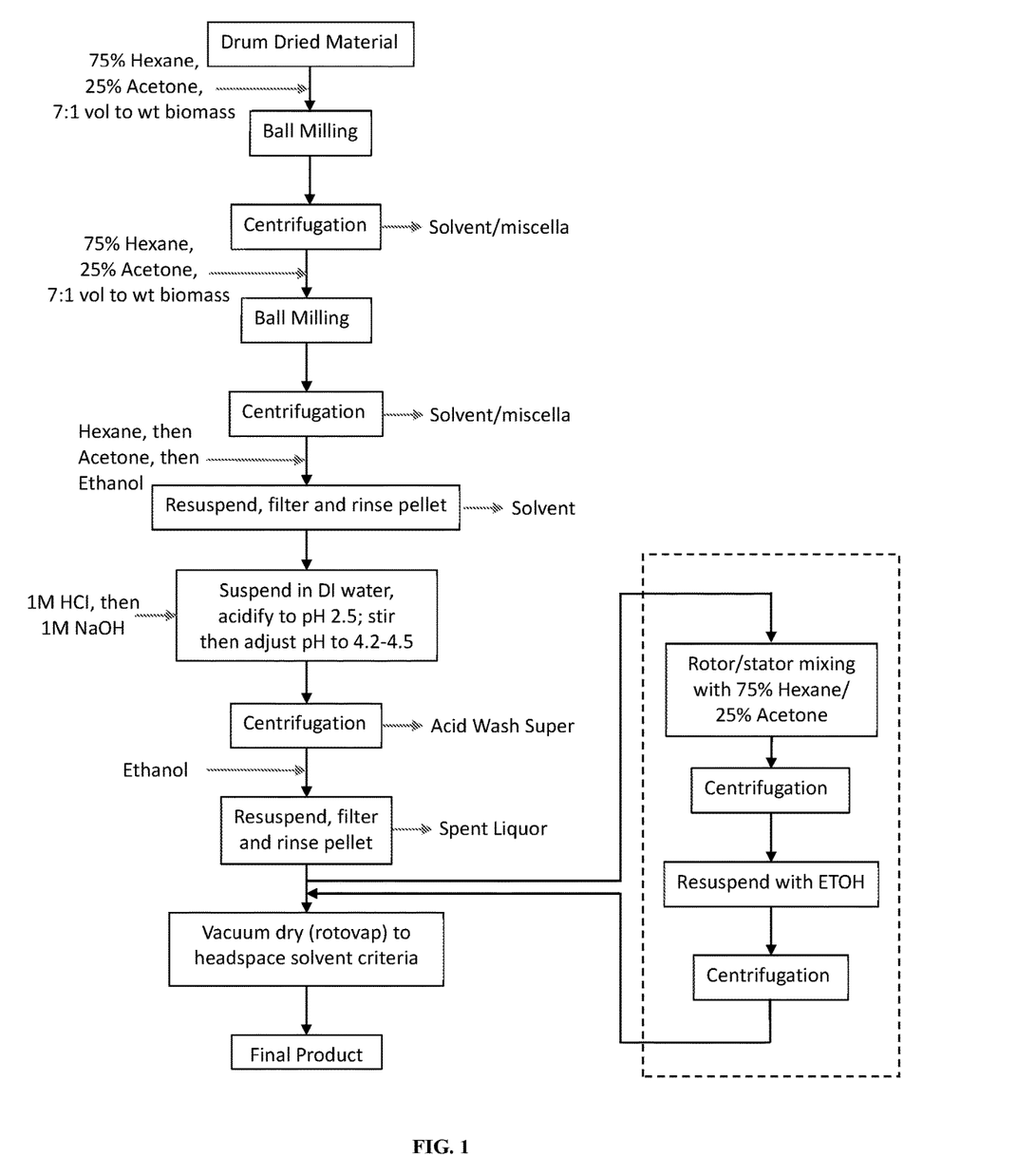
FIG. 1 is a flow chart showing steps than can be used in various embodiments of the methods of the invention. Not all steps need be included in every embodiment of the methods. The steps can be performed in the order shown in FIG. 1, or in a different order.
Figure 2:
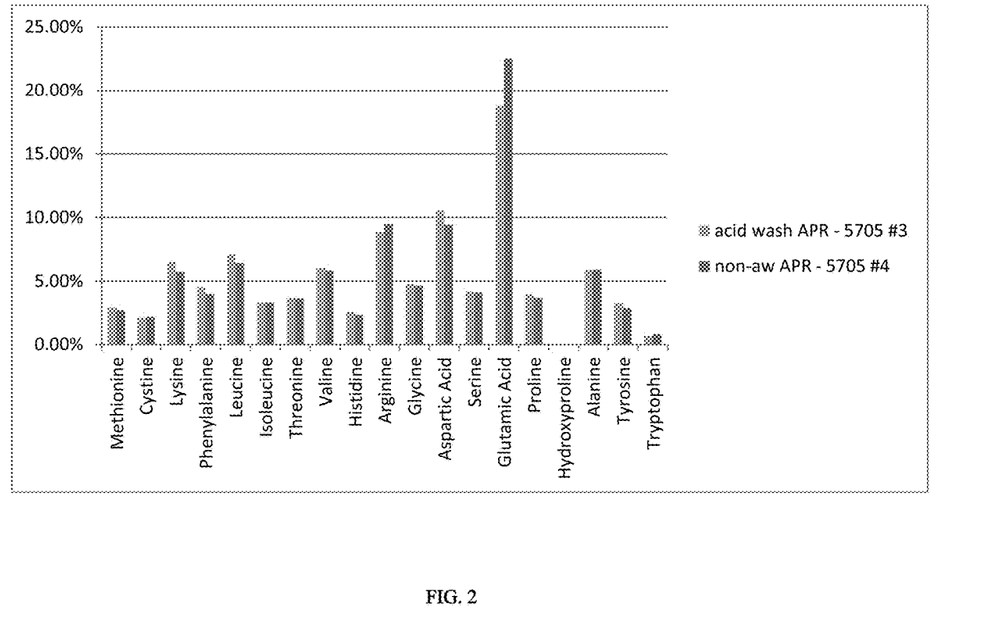
FIG. 2 is a bar graph illustrating the percentages of the named amino acids contained in a dried protein concentrate product from methods including an acid wash step versus methods not including an acid wash step.

The methods of the invention convert a biomass containing a proto-protein into a proteinaceous or protein-rich concentrate. The fatty acid methyl ester (FAME) profile of the biomass at various steps can be evaluated to determine the quantity of lipidic material removed during the processes. Table 1 and FIG. 1 show the percent removal of FAME by the processing steps of the invention.

TABLE 1

Percent removal of FAME by processing steps

| Sample ID | Process Step | | | |
| --- | --- | --- | --- | --- |
| | First Bead Milling | Second Bead Milling | Acid Wash | Final |
| 505-002 | — | 25% | 26% | 59% |
| 506-002 | 19% | 34% | 21% | 79% |
| 514-002 | 8% | 50% | 24% | 80% |
| average | 13.5% | 33% | 24% | |

Figure 3:
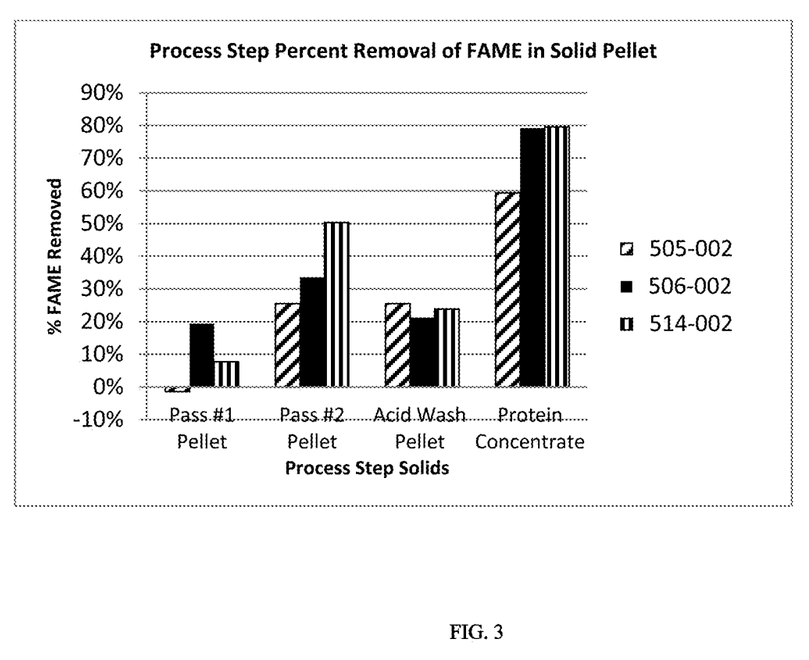
FIG. 3 is a bar graph illustrating the removal of lipidic material at steps of a process of the invention.

The values in Table 1 reflect the percent of lipid removed by the indicated process step from the input material at that step. "Final" indicates the percent of total lipid removed versus the lipid content of the starting biomass. The data corresponds to the graph in FIG. 3. In various embodiments at least 60% or at least 70% or at least 75% of the lipid content in the fermented biomass that begins the methods is removed by the methods of the invention.

In some embodiments the biomass (or proto-protein) has a % FAME of greater than 9% or greater than 10% or greater than 11% or greater than 12% or greater than 13%. As a result of the methods described herein the % FAME can be reduced to less than 5% or less than 4% or less than 3% or less than 2% or less than 1% or less than 0.75% or less than 0.50%, all w/w.

The para-anisidine test (pAV), which is a standard test for secondary oxidation products of lipids, can also be used to monitor the amount of secondary oxidation products of lipids present after the processes of the invention, and therefore further characterize the protein product produced by the methods of the invention. In some embodiments the protein product produced by the methods of the invention has a pAV value of less than 2.0 or less than 1.0 or less than 0.9 or less than 0.8 or less than 0.7 or less than 0.6 or less than 0.5

Additional Methods

In some embodiments the invention provides methods of increasing the protein content of a biomass. In some embodiments the product of the invention is a protein-containing product having a higher protein concentration than the original biomass, with neutral color and improved hedonic or organoleptic properties. In various embodiments the protein-containing biomass that enters the processes of the invention can have a protein content of less than 65% or 50-65% or 40-70% or 45-65% or 45-70% (all w/w) and the protein content of the product of the methods is raised to greater than 65% or greater than 68% or greater than 70% or greater than 72% or greater than 75% or greater than 77% or greater than 80% or 70-90% or 65-90% or 70-90% or 72-87% or 75-85% or 75-80%.

The invention also provides methods of lowering the arginine and glutamic acid (or glutamic acid and glutamine) content of a protein material. Arginine and glutamic acid (and glutamine) are amino acids that are generally easy to find in various types of food products. In many embodiments it is desirable to have a protein-rich food or food ingredient that has a lower content of these common amino acids and a more balanced supply of the 20 essential amino acids. The methods of the invention produce a protein product or food ingredient with a lower amount of glutamic acid (or glutamic acid and glutamine) and arginine than is commonly available in food sources. In various embodiments the percent of glutamic acid (or glutamic acid and glutamine) is lowered from more than 21% or more than 22% to less than 20% or less than 19% (% of total amino acids). The percent of arginine is lowered from more than 9% to less than 9% (% of total amino acids). The methods of lowering the arginine and glutamic acid (or glutamic acid and glutamine) content comprise any of the methods described herein.

EXAMPLE 1

This example provides a general scheme for producing a dried protein material or concentrate (e.g., a powder) containing a proto-protein from algal biomass. This example illustrates a specific method but persons of ordinary skill with resort to this disclosure will realize other embodiments of the methods, as well as that one or more of the steps included herein can be eliminated and/or repeated. Furthermore, any of the steps described herein can be included in any of the methods.

In this example algae (chytrids) of the genus $Aurantiochytrium$ sp. were used and were cultivated in a fermenter containing a marine medium containing 0.1 M glucose and 10 g/L of yeast extract (or peptone substitute), which supplied a source of organic carbon. The medium also contained macronutrients, including 0.1M NaCl, 0.01M $CaCl_2$, 0.04M $Na_2SO_4$, 0.03M $KH_2PO_4$, 0.04M $(NH4)_2SO_4$, 0.006M KCl, 0.02M $MgSO_4$), plus nanomolar quantities of vitamin B12, thiamine and biotin. The culture was maintained at 30° C. for 24 hours with 300-80 rpm of agitation, 0.1 vvm to 1.0 vvm aeration, 50% dissolved oxygen, and pH controlled to 6.3±0.1 using 30% NaOH.

After harvesting, the fermentation broth was removed from the cells via centrifugation and the resulting biomass pellet was diluted in water and re-centrifuged (cell wash). The resulting paste was mixed with antioxidants to prevent oxidation of oils and other components, and then drum dried to remove water, which produced a dry cellular material.

A pasteurization step was performed by raising the temperature of the broth to about 65° C. and holding it at that temperature for about 30 minutes. The dry cells were then thoroughly lysed in 100% ethanol in a bead mill. This is a homogenization and solvent extraction step and removes soluble substances such as lipids, and the delipidated biomass is separated from the miscella using centrifugation.

The biomass was then subjected to an acid wash via titration of 1 N $H_2SO_4$, until the pH was acidified to about 3.5. The biomass was then mixed for about 30 minutes. The pH was then raised to about 4.5 with 1 N NaOH and the biomass mixed for 1 hour.

The acid washed material was then centrifuged and the supernatant removed. The pellet was then subjected to two re-washing/extraction steps, which involved two rounds of suspension in 100% ethanol followed by high shear mixing and centrifugation. The supernatant was decanted to maximize extraction and removal of undesired compounds. The high shear mixing was performed with a rotor stator type mixer (e.g., IKA ULTRA-TURRAX®) with the temperature being controlled at <20° C. by an ice bath. The resultant ethanol-washed pellet (biomass) was then dried by placing in a modified rotary evaporation flask to promote tumble-drying at room temperature under moderate vacuum. After approximately 4 hours the material changed from a paste to a powder. At this point, the material was removed from the rotary evaporator and ground to a fine powder with a mortar and pestle. This material was then placed on an aluminum tray in a vacuum oven at 90° C. for approximately 11 hours to remove any residual solvent or moisture. Once dry, the material was passed through a particle size classifier to remove particles greater than 300 um in size. These particles can be completely removed from the final product if desired, or further ground up and returned back to the final product. The end result of the process was a uniform, neutral colored powder of neutral hedonic character, which can be packaged under nitrogen and stored in a –80° C. freezer.

EXAMPLE 2

Three independent fermentations were performed on algae of the genus $Aurantiochyrium$ sp. in medium similar to that of Example 1 and the mass of the acid wash supernatant stream was quantitated, and protein determined by the Dumas method (quantitative determination of Nitrogen by elemental analysis). As shown in Table 2 below, the acid wash removed between 8.8% and 15.8% of the initial feedstock mass. Converting nitrogen content to protein content by the calculation (N*6.25) estimates the protein content of the acid wash solids is 12.15% to 15.50% protein. The protein removed by the acid wash step ranged from 2.01% to 3.4% of the initial protein in the feed.

TABLE 2

Acid Wash Supernatant Masses and Protein

| | Sample 825 | Sample 908 | Sample 319 |
| --- | --- | --- | --- |
| Mass removed, % of feed | 15.80% | 14.00% | 8.80% |
| Acid wash Solids % protein | 12.60% | 12.15% | 15.50% |

TABLE 2-continued

Acid Wash Supernatant Masses and Protein

|  | Sample 825 | Sample 908 | Sample 319 |
|---|---|---|---|
| Protein, % of feed Protein | 3.40% | 2.70% | 2.01% |

EXAMPLE 3

An additional example of the impact of the acid wash upon amino acid composition is shown below. Two separate processes were performed where the acid wash supernatant was dialyzed and dried, and analyzed for amino acid composition. An *Aurantiochytrium* (chytrid) strain was processed as described above, the acid wash supernatant and algal protein concentrate were analyzed and compared to the initial dry biomass feed. It was found that glutamic acid (or glutamic acid and glutamine) and arginine are selectively removed from the biomass during the acid wash.

Without wanting to be bound by any particular theory it is believed that the acid wash step prepares the proteinaceous material for a preferential protein removal so that the content of generally unwanted amino acids arginine, glutamic acid (or glutamic acid and glutamine), and hydroxyproline is lowered in the final protein product versus the raw algal protein. After acid washing the samples were subjected to two additional rounds of solvent washing. It is also believed that the acid wash step exposes or otherwise renders certain proteins in the proteinaceous material susceptible to removal, and these removed proteins are high in the content of these unwanted amino acids. This is advantageous since it allows for the production of a more nutritionally balance protein material. The content of arginine and glutamic acid (or glutamic acid and glutamine) and hydroxyproline is measured by calculating the ratio of each amino acid in the final protein product pellet versus the content in the supernatant. Thus a low ratio indicates the amino acid is more prevalent in the supernatant. Table 3 below illustrates the data and shows that the ratio for these three amino acids is less than 2 or less than 1 or less than 0.75 for arginine, less than 2 or less than 1 or less than 0.75 or less than 0.60 for glutamic acid (or glutamic acid and glutamine), and less than 2 or less than 1 or less than 0.75 or less than 0.55 for hydroxyproline.

TABLE 3

| Amino Acid % of sample | Acid Wash Supernatant (AWS) | Final Product in Pellet | Ratio of Pellet to AWS amino acid composition |
|---|---|---|---|
| Methionine | 0.08% | 0.83% | 10.35 |
| Cystine | 0.13% | 0.48% | 3.80 |
| Lysine | 0.76% | 4.38% | 5.76 |
| Phenylalanine | 0.01% | 2.82% | 315.04 |
| Leucine | 0.21% | 4.56% | 21.26 |
| Isoleucine | 0.19% | 2.33% | 12.40 |
| Threonine | 0.50% | 3.07% | 6.13 |
| Valine | 0.33% | 3.66% | 11.07 |
| Histidine | 0.35% | 1.76% | 5.04 |
| Arginine | 15.61% | 11.12% | 0.71 |
| Glycine | 0.95% | 3.23% | 3.40 |
| Aspartic Acid | 1.17% | 6.86% | 5.86 |
| Serine | 0.57% | 3.27% | 5.71 |
| Glutamic Acid | 76.24% | 41.97% | 0.55 |
| Proline | 0.35% | 2.64% | 7.58 |
| Hydroxyproline | 0.05% | 0.03% | 0.49 |

TABLE 3-continued

| Amino Acid % of sample | Acid Wash Supernatant (AWS) | Final Product in Pellet | Ratio of Pellet to AWS amino acid composition |
|---|---|---|---|
| Alanine | 1.70% | 4.20% | 2.48 |
| Tyrosine | 0.72% | 2.27% | 3.18 |
| Tryptophan | 0.09% | 0.79% | 8.87 |
| TOTAL: | 100.00% | 100.00% | 1.00 |

EXAMPLE 4

Lipid Removal During Acid Wash

Two processes using the same biomass source (chytrid #705) were performed to show the effect of the acid wash on FAME content in the protein concentrate. After drum drying the initial biomass from the fermenter the samples were subjected to two rounds of mechanical homogenization by bead milling followed by a step of solvent washing in 100% isopropyl alcohol. Sample 225-002/A was subjected to an acid washing step as describe in Example 1 while sample 225-002/A.2 was not. Each sample was then subjected to two reworking solvent washing steps in 100% isopropyl alcohol before being dried in a rotary evaporator. The results clearly show the lowering of the final FAME content in the protein product from 2.19% of final dry weight to 0.89% of final dry weight, which can be attributable to the acid washing step.

TABLE 4

| Lot Designation | Experimental Descriptor | Sample Descriptor | % Protein (Dumas) | Protein concentrate FAME % of dry weight |
|---|---|---|---|---|
| 225-002/A | Acid Washed | Drum Dry/IPA Mill/ AW/Rework/Drying | 83.66% | 0.89% |
| 225-002/A.2 | Non-Acid Washed | Drum Dry/IPA Mill/ Rework/Drying (No acid wash) | 81.22% | 2.19% |

The stepwise efficiency of removing available lipids through the process was examined in order to see the specific contribution of the acid wash step for the removal of lipids. FIG. 1 shows the results for three independent treatments performed using the strain from Example 3. Ethanol was used as the solvent prior to and after the acid wash. The acid wash step included a first adjustment to pH 3.5 with 1 N $H_2SO_4$ per Example 1, followed by adjustment to pH 4.5 with 1 N KOH. For each significant process step, the resultant solids were analyzed for FAME content and a percent of available FAME that was removed in the step was calculated, as shown in FIG. 1. The acid wash step removed 26%, 21%, and 24% of the lipid present in the biomass after the bead mill processing (samples 505-002, 506-002, and 514-002, respectively). The data show that when an acid wash step is included in the preparation method the percent of FAME in the protein produce produced is reduced 0.89%, or to less than 1%. When the acid wash step is omitted from the process the percent FAME in the protein produce is 2.19%, or higher than 2%.

EXAMPLE 5

The para-anisidine test (pAV), which is a standard test for secondary oxidation products of lipids, was used to monitor the amount of secondary oxidation products of lipids present after certain steps of the methods. The pAV values were determined for four independently-fermented batches of chytrid biomass, tested at three steps in the downstream processing: water-washed biomass collected immediately at the conclusion of fermentation (washed pellet); pasteurized biomass; final protein concentrate (after acid washing and two re-working steps). The downstream process steps are shown in the process flow diagram of FIG. 1b and described in Table 5 below.

TABLE 5 pAV Relative to Soy Protein

| p-AV relative to soy protein | Washed Pellet | Pasteurized Biomass | Protein Concentrate |
|---|---|---|---|
| IP-150505-002 | 4.0 | 4.0 | 0.8 |
| IP-150506-002 | 3.6 | 5.4 | 0.5 |
| IP-150511-002 | 3.5 | 2.5 | 0.8 |
| IP-150514-002 | 1.6 | 1.5 | 0.4 |

The values shown in Table 5 are ratios of the pAV of the algal protein concentrate relative to the pAV value determined for a commercially available protein isolate produced from soybean (which is used as a benchmark standard). The data show that prior to the processing steps of bead milling/ethanol extraction and acid washing, the algal protein concentrate has a higher content of secondary lipid oxidation products than does a soybean protein isolate. But after two bead milling/ethanol solvent washing steps and one acid washing step with two reworking solvent washing steps, each of the four samples of protein product have a lower content of secondary lipid oxidation products than the soybean protein isolate. Thus, the steps of the invention, including the acid washing, improve the quality of the protein concentrate with respect to lipid content (and therefore lipid oxidation) and organoleptic properties.

EXAMPLE 6

Sensory Panels

Reports from sensory panels composed of persons selected to evaluate the organoleptic properties of the protein composition have demonstrated the processes of the present invention result in improved organoleptic (hedonic) properties. The presence of an unpleasant fishy odor or taste, or ammonia-like odor or taste, or briny odor or taste was markedly decreased as a result of the process while the protein material maintained a high protein content.

Persons of ordinary skill in the art understand how to assemble a sensory evaluation panel and evaluate food samples in a reliable manner, for example the 9 point hedonic scale, which is also known as the "degree of liking" scale can be utilized. (Peryam and Girardot, N. F., *Food Engineering*, 24, 58-61, 194 (1952); Jones et al. *Food Research*, 20, 512-520 (1955)). This example therefore provides only one scientifically valid manner of performing such evaluation.

A panel of six adult subjects (3 male and 3 female) evaluate the organoleptic taste and smell properties of eight protein products derived from algal (chytrid) biomass processed as described in Example 1. The subjects are randomly assigned an identifying letter A-F. Four of the eight samples are prepared according to the procedure of Example 1, which includes one acid wash procedure ("test" samples). The other four samples are control samples, which have been prepared identically except they were not subjected to the acid washing step ("control" samples). After the samples are dried and obtained in powdered form, 1 gram of protein powder is dissolved in deionized water to make a 10% solution in a plastic tube. The eight samples are provided to each subject in random order and without any subject knowing the identity of any sample.

The samples are evaluated for whether the samples are organoleptically pleasing or unpleasant. The subjects are asked to consider the categories "fishy taste and/or smell" and "ammonia-like taste and/or smell" and "briny taste and/or smell" according to the following five point scale: 0—none; 1—slight; 2—moderate; 3 high; and 4—extreme. The subjects also evaluate the general organoleptic properties as acceptable or unacceptable, using soy protein similarly prepared as a standard, and whether the samples have organoleptic properties equal to, better, or worse than the soy protein sample. The subjects are instructed to assign the sample the lowest rating received in either category. The manner of testing is first to evaluate the aroma of the sample. If the subject rates the aroma a 3 or 4 in any category the sample is considered organoleptically unpleasant or unacceptable and no tasting is required. If the aroma rates between 0 and 2 the subject further tests the sample by the known "sip and spit" method, with sample being held in the mouth for 1-2 seconds.

In the aroma evaluation portion of the study, 5 of the 6 panel members rate all four control samples a 3, i.e., high fishy smell and/or high ammonia-like smell and/or high briny smell, and therefore organoleptically unacceptable. The subjects also rate the control samples as less pleasing than the soy protein sample. Therefore these 5 subjects do not proceed to the taste portion of the study for these samples and the samples are rated as having unpleasant or unacceptable organoleptic properties. The remaining subject rates three of the four control samples a "3", and the remaining control sample a "2." For the fourth control sample this subject proceeds to the taste portion and rates the remaining control sample a 3 and rates all samples less pleasing than the soy sample.

For the four test samples in the aroma portion of the study, 5 of the 6 subjects rate all four of the samples a "0" and equal to soy. The remaining subject rates three samples a "0" and equal to soy and one sample a 1 and less pleasing than soy.

The subjects then proceed to the taste portion of the study. For the taste portion five of the subjects rate all four samples a "0" for taste and equal to soy. The remaining subject rates three samples a "0" and equal to soy, and one sample a "1" and less pleasing than soy.

The data are summarized in Table 6 and show that the protein composition prepared according to the present invention has improved organoleptic properties versus samples prepared according to traditional methods. It is also seen that samples prepared according to the invention are clearly more likely to be equal to soy protein standard in organoleptic taste and smell properties and to have acceptable or desirable organoleptic properties.

TABLE 6

Samples Evaluated as either organoleptically pleasing or unpleasant

| | A | B | C | D | E | F |
|---|---|---|---|---|---|---|
| 1 test | S—0 T—0 | S—0 T—0 | S—0 T—0 | S—0 T—0 | S—0 T—0 | S—0 T—0 |

TABLE 6-continued

Samples Evaluated as either organoleptically pleasing or unpleasant

|  | A | B | C | D | E | F |
|---|---|---|---|---|---|---|
| 2 test | S—0 | S—0 | S—0 | S—1 | S—0 | S—0 |
|  | T—0 | T—0 | T—0 | T—1 | T—0 | T—0 |
| 3 test | S—0 | S—0 | S—0 | S—0 | S—0 | S—0 |
|  | T—0 | T—0 | T—0 | T—0 | T—0 | T—0 |
| 4 test | S—0 | S—0 | S—0 | S—0 | S—0 | S—0 |
|  | T—0 | T—0 | T—0 | T—0 | T—0 | T—0 |
| 5 control | S—3 | S—3 | S—3 | S—3 | S—3 | S—3 |
| 6 control | S—3 | S—2 | S—3 | S—3 | S—3 | S—3 |
|  |  | T—3 |  |  |  |  |
| 7 control | S—3 | S—3 | S—3 | S—3 | S—3 | S—3 |
| 8 control | S—3 | S—3 | S—3 | S—3 | S—3 | S—3 |

The invention claimed is:

1. A method of making a food product comprising:
   producing a protein composition for use in a food product by a method comprising
   a) performing a pasteurization step on a cellular biomass comprising cells from an organism of the Class *Labyrinthulomycetes* prior to lysing of the cells to produce a pasteurized biomass,
   b) subsequent to step a), subjecting the pasteurized biomass to an acid wash at a pH of less than 4.5 for at least 10 minutes, wherein the acid wash frees lipid moieties from protein in the cellular biomass; lysing the cells of the biomass; and producing the protein composition for use in a food product; and
   combining said protein composition with a food or food ingredient to make said food product;
   wherein the protein composition has a protein content of at least 60% w/w, and
   wherein the protein composition has a para-anisidine test (pAV) value of less than about 2.0.

2. The method of claim 1 wherein the food product is selected from the group consisting of: a cereal, a snack bar, a soup or stew, a nutrition bar, a binder for bulk artificial meats, an artificial cheese.

3. The method of claim 1 wherein the organism of the Class Labyrinthulomycetes is from a genus selected from the group consisting of: *Aurantiochytrium, Botryochytrium, Japanochytrium, Oblongochytrium, Schizochytrium*, and *Thraustochytrium*.

4. The method of claim 3 wherein the protein composition has a protein content of at least 70% w/w.

5. The method of claim 1, wherein the protein composition for use in a food product is organoleptically acceptable.

6. The method of claim 1, further comprising performing a delipidation step on the cellular biomass after the pasteurization step and before the cellular biomass is subjected to the acid wash.

* * * * *